(12) United States Patent
Kakuta et al.

(10) Patent No.: US 7,384,723 B2
(45) Date of Patent: *Jun. 10, 2008

(54) OPTICAL INFORMATION RECORDING MEDIUM

(75) Inventors: Takeshi Kakuta, Kanagawa (JP); Toshio Ishida, Kanagawa (JP); Takako Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 420 days.

This patent is subject to a terminal disclaimer.

(21) Appl. No.: 10/347,763

(22) Filed: Jan. 22, 2003

(65) Prior Publication Data

US 2003/0148215 A1 Aug. 7, 2003

(30) Foreign Application Priority Data

Jan. 23, 2002 (JP) ............................ 2002-014035
Mar. 8, 2002 (JP) ............................ 2002-063561

(51) Int. Cl.
*G11B 7/24* (2006.01)
(52) U.S. Cl. ............ 430/270.16; 430/945; 430/270.15; 428/64.8; 428/64.6; 369/275.5; 369/284
(58) Field of Classification Search ............... 428/64.1, 428/64.2, 64.4, 64.7, 65.1, 65.2; 430/271.1, 430/270.1
See application file for complete search history.

(56) References Cited

U.S. PATENT DOCUMENTS

| | | | |
|---|---|---|---|
| 4,412,231 A | 10/1983 | Namba et al. | |
| 4,458,004 A | 7/1984 | Tanikawa | |
| 4,465,767 A | 8/1984 | Oba et al. | |
| 4,736,966 A * | 4/1988 | Haddock et al. | 283/69 |
| 4,871,408 A * | 10/1989 | Honma et al. | 156/83 |
| 5,075,145 A | 12/1991 | Yamamoto et al. | |
| 5,147,490 A * | 9/1992 | Leenders et al. | 156/238 |
| 5,332,608 A | 7/1994 | Tsuji et al. | |
| 5,340,698 A | 8/1994 | Hirata et al. | |
| 5,490,131 A | 2/1996 | Ohta et al. | |
| 5,747,413 A * | 5/1998 | Amano et al. | 503/201 |
| 5,763,868 A * | 6/1998 | Kubota et al. | 235/487 |
| 5,798,161 A * | 8/1998 | Kita et al. | 428/64.1 |
| 5,806,388 A * | 9/1998 | Imataki | 83/13 |

(Continued)

FOREIGN PATENT DOCUMENTS

EP 0 653 685 * 5/1995

(Continued)

OTHER PUBLICATIONS

English language translation of Hideki.*

(Continued)

*Primary Examiner*—Martin J. Angebranndt
(74) *Attorney, Agent, or Firm*—Sughrue Mion, PLLC

(57) ABSTRACT

An optical information recording medium including a substrate having successively disposed thereon a recording layer, an interlayer, a pressure sensitive adhesive layer and a cover film in which information is recordable and reproducible by irradiating laser light and the pressure sensitive adhesive layer contains a polymer having a glass transition temperature Tg of 0° C. or lower, as well as a method for producing an optical information recording medium including adhering a cover layer to a surface of a recording layer so that a pressure sensitive adhesive layer is abutted on the surface of the recording layer, and an optical information recording medium produced by the method.

22 Claims, 2 Drawing Sheets

U.S. PATENT DOCUMENTS

| | | | |
|---|---|---|---|
| 5,882,760 A | 3/1999 | Hatwar et al. | |
| 5,962,181 A | 10/1999 | Daems et al. | |
| 5,965,229 A | 10/1999 | Zhou et al. | |
| 5,968,708 A | 10/1999 | Yashiro et al. | |
| 6,023,451 A | 2/2000 | Kashiwagi et al. | |
| 6,049,521 A | 4/2000 | Aratani | |
| 6,051,289 A * | 4/2000 | Tsujimoto et al. | 428/1.31 |
| 6,136,751 A * | 10/2000 | Harada | 503/201 |
| 6,168,682 B1 * | 1/2001 | Bennett et al. | 156/295 |
| 6,221,454 B1 * | 4/2001 | Saito et al. | 428/64.1 |
| 6,221,455 B1 | 4/2001 | Yasuda et al. | |
| 6,228,455 B1 | 5/2001 | Huang et al. | |
| 6,246,656 B1 | 6/2001 | Kawakubo et al. | |
| 6,269,072 B1 | 7/2001 | Ohgo | |
| 6,353,592 B1 | 3/2002 | Kashiwagi et al. | |
| 6,506,469 B2 | 1/2003 | Takahashi et al. | |
| 6,572,947 B2 | 6/2003 | Sabi et al. | |
| 6,576,320 B2 | 6/2003 | Hayashida et al. | |
| 6,627,288 B1 | 9/2003 | Ogiso et al. | |
| 6,661,770 B2 | 12/2003 | Kakuta et al. | |
| 6,699,591 B2 | 3/2004 | Ishida et al. | |
| 6,731,592 B2 | 5/2004 | Usami | |
| 6,767,987 B2 * | 7/2004 | Okazaki | 528/310 |
| 6,808,782 B2 | 10/2004 | Usami et al. | |
| 6,811,850 B1 * | 11/2004 | Hirata | 428/64.2 |
| 6,969,764 B2 * | 11/2005 | Ogiso et al. | 540/145 |
| 2001/0044002 A1 | 11/2001 | Shingai et al. | |
| 2002/0044523 A1 | 4/2002 | Oshima et al. | |
| 2002/0076648 A1 | 6/2002 | Berneth et al. | |
| 2002/0122379 A1 * | 9/2002 | Tamada et al. | 369/288 |
| 2002/0145967 A1 | 10/2002 | Fujii et al. | |
| 2003/0003261 A1 | 1/2003 | Saito et al. | |
| 2003/0017295 A1 | 1/2003 | Ishida et al. | |
| 2003/0031954 A1 * | 2/2003 | Kakuta et al. | 430/270.2 |
| 2003/0081537 A1 | 5/2003 | Shinotsuka | |
| 2003/0082331 A1 | 5/2003 | Ishida et al. | |
| 2003/0090990 A1 | 5/2003 | Ozawa et al. | |
| 2003/0116266 A1 * | 6/2003 | Kitano et al. | 156/289 |
| 2003/0118938 A1 | 6/2003 | Ishida et al. | |
| 2003/0183511 A1 * | 10/2003 | Kakuta et al. | 204/192.27 |
| 2004/0125739 A1 | 7/2004 | Usami et al. | |

FOREIGN PATENT DOCUMENTS

| | | | |
|---|---|---|---|
| EP | 0 837 459 A1 | | 4/1998 |
| EP | 0 871 164 A2 | | 10/1998 |
| EP | 1 017 045 A1 | | 7/2000 |
| EP | 1 047 055 A1 | | 10/2000 |
| EP | 1047055 | * | 10/2000 |
| EP | 1 065 663 A2 | | 1/2001 |
| EP | 1 083 555 A1 | | 3/2001 |
| EP | 1 103 962 A2 | | 5/2001 |
| EP | 1 154 413 A2 | | 11/2001 |
| EP | 1 191 525 A2 | | 3/2002 |
| EP | 1271499 | * | 1/2003 |
| JP | 60-204395 A | | 10/1985 |
| JP | 63-268783 A | | 11/1988 |
| JP | 02-196689 A | | 8/1990 |
| JP | 04-064936 A | | 2/1992 |
| JP | 06-044608 A | | 2/1994 |
| JP | 7-266703 A | | 10/1995 |
| JP | 08-045125 A | | 2/1996 |
| JP | 09-147418 | * | 6/1997 |
| JP | 09-237440 | * | 9/1997 |
| JP | 11-31337 A | | 2/1999 |
| JP | 11-120617 A | | 4/1999 |
| JP | 11-138993 A | | 5/1999 |
| JP | 2000-040255 A | | 2/2000 |
| JP | 2000067468 | | 3/2000 |
| JP | 2000-285520 A | | 10/2000 |
| JP | 2000-298874 A | | 10/2000 |
| JP | 2000-311392 A | | 11/2000 |
| JP | 2001-43566 | * | 2/2001 |
| JP | 2001-43566 A | | 2/2001 |
| JP | 2001-155383 A | | 6/2001 |
| JP | 2001243658 | | 9/2001 |
| JP | 2001-287465 A | | 10/2001 |
| JP | 2002-140842 A | | 5/2002 |
| JP | 2003-502783 A | | 1/2003 |
| JP | 2003-524853 A | | 8/2003 |
| KR | 2001-090164 | * | 10/2001 |
| WO | 01/47719 | * | 7/2001 |
| WO | 200147719 | * | 7/2001 |
| WO | 02/054399 | * | 7/2002 |

OTHER PUBLICATIONS

Japanese Patent Office Action dated Feb. 1, 2005.

Kees Schep, et al., ISOM 2000, International Symposium on Optical Memory 2000, c/o Business Center for Academic Societies Japan, Technical Digest.

* cited by examiner

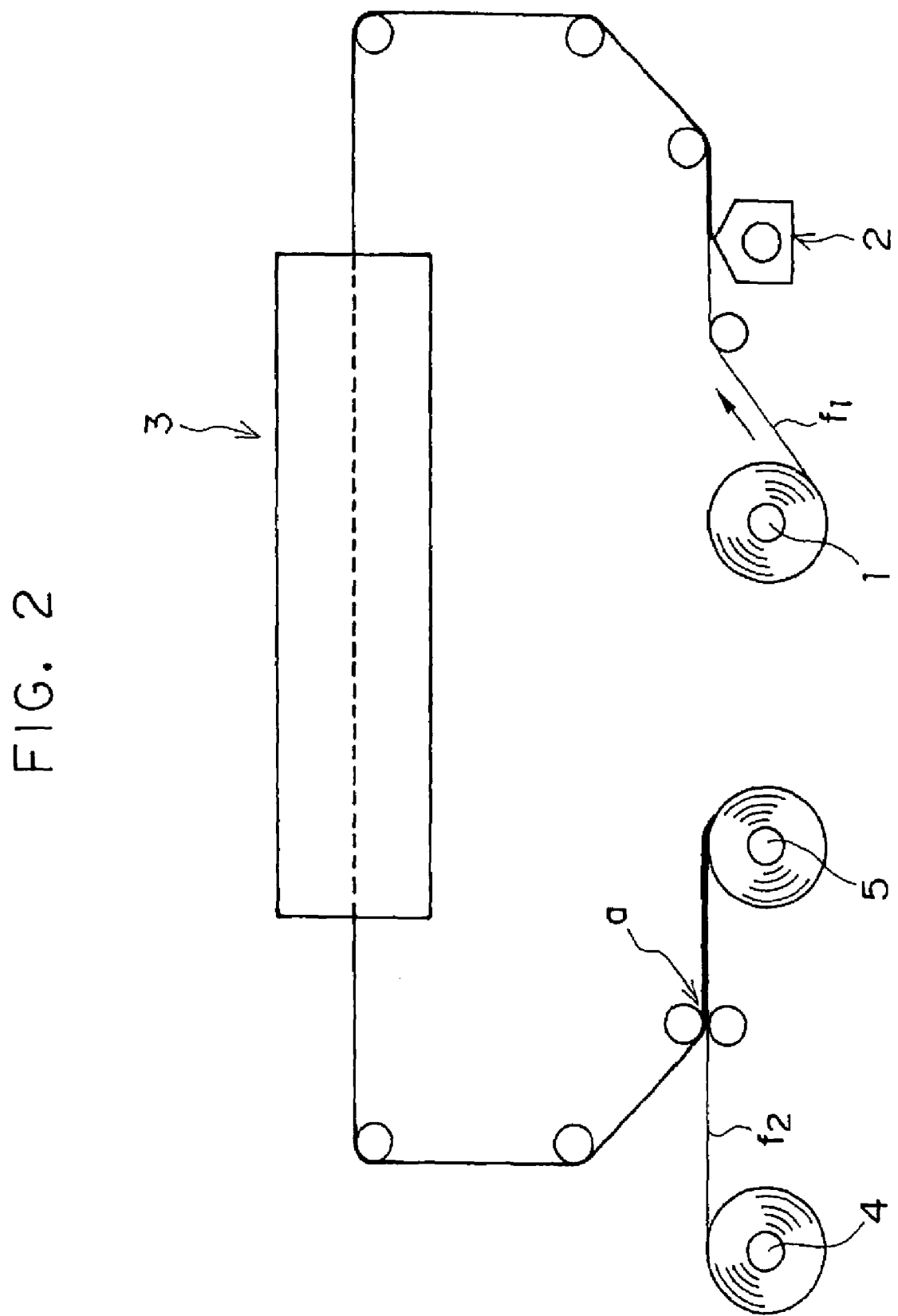

OPTICAL INFORMATION RECORDING MEDIUM

BACKGROUND OF THE INVENTION

1. Field of the Invention

The present invention relates to an optical information recording medium, and specifically to an optical information recording medium recordable by heat mode, as well as a method for producing a writable optical information recording medium capable of recording and reproducing information using laser light having a specific wavelength, and an optical information recording medium produced by the production method.

2. Description of the Related Art

Heretofore, optical information recording media (optical discs) on which information can be written only once by irradiating laser light have been known. The optical disc is also referred to as the writable CD (so-called CD-R) and typically comprises a transparent disc substrate having successively disposed thereon a recording layer including an organic compound such as an organic dye, a light-reflective layer including metal such as Au and a protective layer (cover layer) made of a resin containing an adhesive layer for adhesion to the recording layer. The CD-R has an advantage in that it can reproduce information using commercially available CD players, and the demand for CD-Rs has increased recently along with the spread of personal computers. Information can be recorded and reproduced by irradiating laser light from the side provided with the resin layer. For example, information is recorded on the CD-R by irradiating the CD-R with laser light in a near-infrared region (usually, laser light having a wavelength of around 780 nm). Specifically, the portion of the recording layer that is irradiated absorbs light, whereby the temperature rises locally at the irradiated portion. The rise in temperature produces a physical or chemical change (for example, formation of pits) to alter the optical properties of the irradiated portion, whereby information is recorded. The information thus recorded on the CD-R is ordinarily reproduced by irradiating the CD-R with laser light having the same wavelength as that of the laser light used to record the information and detecting a difference in reflectance between the region of the recording layer whose optical properties have been changed (recorded portion) and the region whose optical properties have not been changed (unrecorded portion).

In recent years, there has been a demand for optical information recording media having higher density, and writable digital versatile discs (so-called DVD-Rs) have been proposed in response to that demand (Nikkei New Media, extra issue entitled "DVD", 1995) which have been practically used. A DVD-R typically comprises two transparent disc substrates that each have successively disposed thereon a recording layer containing an organic dye, a light-reflective layer and a protective layer, with the discs being adhered so that the recording layers face inward or so that protective substrates having the same disc shape as these discs are disposed on outer sides of the adhered discs. Moreover, the transparent disc substrate includes a guide groove (pre-groove) used for tracking a laser irradiated onto the CD-R, with the groove having a narrower track pitch (0.74-0.8 μm) that is equal to or less than half of that in a CD-R. Information is recorded and reproduced (played back) by irradiating the DVD-R with laser light in a visible region (usually laser light having a wavelength region ranging from 630 nm to 680 nm), whereby information can be recorded at a higher density than a CD-R.

Recently, high-vision television and networks such as the Internet have rapidly become more widespread. In addition, the start of HDVT (High Definition Television) broadcasting is near at hand. As a result, larger-capacity optical media capable of recording visual information easily and inexpensively are in demand. While DVD-Rs currently play a significant role as large-capacity recording media, the demand for media having greater recording capacity and higher density continues to escalate, and development of recording media that can cope with this demand is also needed. Thus, recording media that have a larger capacity and are able to record information at a high density by irradiating light having a shorter wavelength than that of DVD-Rs are being developed. Since writable optical information recording media capable of recording information only once are being used with increasing frequency for long-term storage and back-up of large amounts of data, there is high demand for development thereof.

Methods for recording information on and reproducing information from an optical information recording medium including a recording layer containing an organic dye, by irradiating, from the side of the medium disposed with a light-reflective layer, the medium with laser light having a wavelength of 530 nm or less, are disclosed in, for example, Japanese Patent Application Laid-Open (JP-A) Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818 and 2000-228028. In these methods, information is recorded and reproduced from an optical disc having a recording layer containing a porphyrin compound, an azo-based dye, a metal azo-based dye, a quinophthalone-based dye, a trimethine cyanine dye, a dicyanovinylphenyl-skeleton dye, a coumarin compounds and a naphthalocyanine compound or the like, by irradiating the optical disc with a blue laser (wavelength: 430 nm, 488 nm) or a blue-green laser (wavelength: 515 nm).

On the other hand, DVDs as the phase change optical disc have been known, which adopt a system of instantaneously heating a recording layer containing an alloy layer such as GeSbTe by irradiating laser light to cause a phase change from a crystalline state to an amorphous state, whereby information is recorded and reproduced by utilizing the change in reflectance in accordance with the phase change. Usually, a recording density of optical information recording media can be increased by shortening a wavelength of laser light for recording and reproducing information and by providing a smaller beam spot by making a numerical aperture (NA) of an objective lens larger. Recently, rapid progress has been made in the development of lasers, from red semiconductor lasers having wavelengths of 680 nm, 650 nm and 635 nm to blue-violet semiconductor lasers (hereinafter referred to as blue-violet lasers) having wavelengths of 400 nm to 500 nm which are capable of recording information at ultra-high densities, and corresponding optical information recording media are also under development. Particularly, since blue-violet lasers became commercially available, an optical recording system utilizing a blue-violet laser and a high NA pick-up has been studied, and a writable optical information recording medium having a phase change recording layer and such an optical recording system has already been reported as a DVR system ("ISOM 2000" pages 210-211). This system has achieved a certain degree of progress toward increasing the recording density of the writable optical information recording media.

In the optical information recording medium used with the blue-violet laser light source, the recording layer formed on the substrate is covered with a thin cover layer having 0.1 mm-0.3 mm thickness. The system using the optical information recording medium described above condenses the beams of laser light using an objective lens having a high numerical aperture (NA) for pick-up and irradiates laser light from the side provided with the thin cover layer of the optical disc for recording information, to thereby realize an increased capacity as large as 22.5 Gbite as the one-side recording capacity.

In the optical information recording medium for use in the optical recording system that utilizes the blue-violet laser and the high NA pick-up described above, it is preferable to reduce the thickness of the cover layer for focusing the objective lens having a high NA when the blue-violet laser light is irradiated to the recording layer. As the cover layer, for example, a thin film is used and adhered to the recording layer using an adhesive or a pressure sensitive adhesive. The thickness of the cover layer, including the adhesive layer formed by curing the adhesive, is usually about 100 μm and may vary depending on the wavelength of the laser to be irradiated and the NA.

The cover layer is formed in the optical information recording medium, usually by adhering a cover film to a recording layer using a UV-curable adhesive. If the recording layer contains an organic dye, an interlayer having a predetermined thickness is disposed between the recording layer and the cover layer in order to prevent the dye from eluting by the action of the UV curable adhesive, which is a liquid. However, as the thickness of the interlayer increases, there arises a problem in that the transmittance of the laser light is reduced, resulting in lowered reflectance of the optical information recording medium.

JP-A No. 2000-67468 describes a method for forming a cover layer by continuously forming a film laminate having a constitution in which a laminate of a transparent film and a pressure sensitive adhesive sheet is provided between releasable films, then fabricating the same into a disc-shape to form a disc-shape film laminate, followed by adhering the resultant laminate to a surface of an optical disc substrate provided with a recording surface so as to match positioning thereof, while peeling off the releasable film at the side in contact with the pressure sensitive sheet.

According to the method described above, when the film laminate is continuously formed and then wound into a roll, a surface shape of the releasable film is transferred to the adhesive surface of the pressure sensitive adhesive sheet. Thus, if a surface roughness of the releasable film is large, a surface roughness of the adhesive surface also increases. Accordingly, the optical information recording medium provided with the cover layer that has been produced using the pressure sensitive adhesive sheet has troublesome incidences of surface displacement, uneven thickness or air bubble contamination, and, as a result, satisfactory recording characteristics or durability cannot be obtained.

SUMMARY OF THE INVENTION

The present invention has been accomplished in view of the foregoing problems. Specifically, the present inventors have found that the problems of the prior art can be overcome by inhibiting a surface shape of a releasable film from being transferred to a pressure sensitive adhesive layer and enhancing an adhesiveness of the pressure sensitive adhesive layer during a step of winding a cover layer sandwiched between releasable films into a roll, to thereby reach the present invention. Accordingly, the invention aims to achieve the following.

It is an object of the invention to provide an optical information recording medium that exhibits high reflectance, a large carrier to noise ratio (C/N) and stable recording and reproducing characteristics.

Another object of the invention is to provide a method for producing an optical information recording medium that is excellent in recording characteristics and durability, which method includes a step of producing a cover layer and winding the layer into a roll, as well as an optical information recording medium produced by the method.

Yet another object of the invention is to provide a method for producing an optical information recording medium having excellent producibility, and an optical information recording medium produced by the method.

The means to achieve the foregoing objects are described below.

A first aspect of the present invention is an optical information recording medium comprising a substrate having successively disposed thereon a recording layer, an interlayer, a pressure sensitive adhesive layer and a cover film, wherein information is recordable and reproducible by irradiating laser light, and the pressure sensitive adhesive layer contains a polymer having a glass transition temperature Tg of 0° C. or lower.

Preferable embodiments of the optical information recording medium of the first aspect of the invention are as follows:

(1) The interlayer has a thickness of 1 to 20 nm.
(2) The recording layer contains an organic dye selected from the group consisting of phthalocyanine-based dyes, benzotriazole-based dyes and aminobutadiene-based dyes.

A second aspect of the invention is a method for producing an optical information recording medium including a substrate having disposed thereon a recording layer to which a cover layer including a cover film provided with a pressure sensitive adhesive layer is adhered so that a surface of the recording layer is abutted on the pressure sensitive adhesive layer, the method comprising the steps of preparing the cover layer by forming a laminate by successively superimposing a first releasable film, the pressure sensitive adhesive layer, the cover film and a second releasable film and winding the laminate into a roll, wherein the first releasable film has a central surface average roughness (SRa) at a surface in contact with a surface of the pressure sensitive adhesive layer of 50 nm or less, a central surface average roughness (SRa) at an opposite surface of 100 nm or less, and a thickness of 20 μm or more.

Preferably, the method for producing the optical information recording medium according to the second aspect of the invention further comprises, after the step of winding the laminate into a roll, the successive steps of maintaining the laminate until a crosslinking reaction in the pressure sensitive adhesive layer is substantially completed, punching the laminate into a disc shape, maintaining the disc-shape laminate while piling the laminate substantially vertically or substantially horizontally, and peeling off the first and the second releasable films.

A third aspect of the invention is an optical information recording medium including a substrate having disposed thereon a recording layer to which a cover layer including a cover film provided with a pressure sensitive adhesive layer is adhered so that a surface of the recording layer is abutted on the pressure sensitive adhesive layer, the optical information recording medium being produced by a method comprising the steps of preparing the cover layer by forming a laminate by successively superimposing a first releasable film, the pressure sensitive adhesive layer, the cover film and a second releasable film and winding the laminate into a roll, wherein the first releasable film has a central surface average roughness (SRa) at a surface in contact with a surface of the pressure sensitive adhesive layer of 50 nm or less, and a central surface average roughness (SRa) at an opposite surface of 100 nm or less, and a thickness of 20 μm or more.

BRIEF DESCRIPTION OF THE DRAWINGS

FIG. 2 is a schematic side view of an apparatus used in an exemplified embodiment of a method for producing an optical information recording medium according to a second aspect of the invention, by which a pressure sensitive adhesive layer is continuously formed on the surface of a cover film.

DESCRIPTION OF THE PREFERRED EMBODIMENTS

Figure 1:
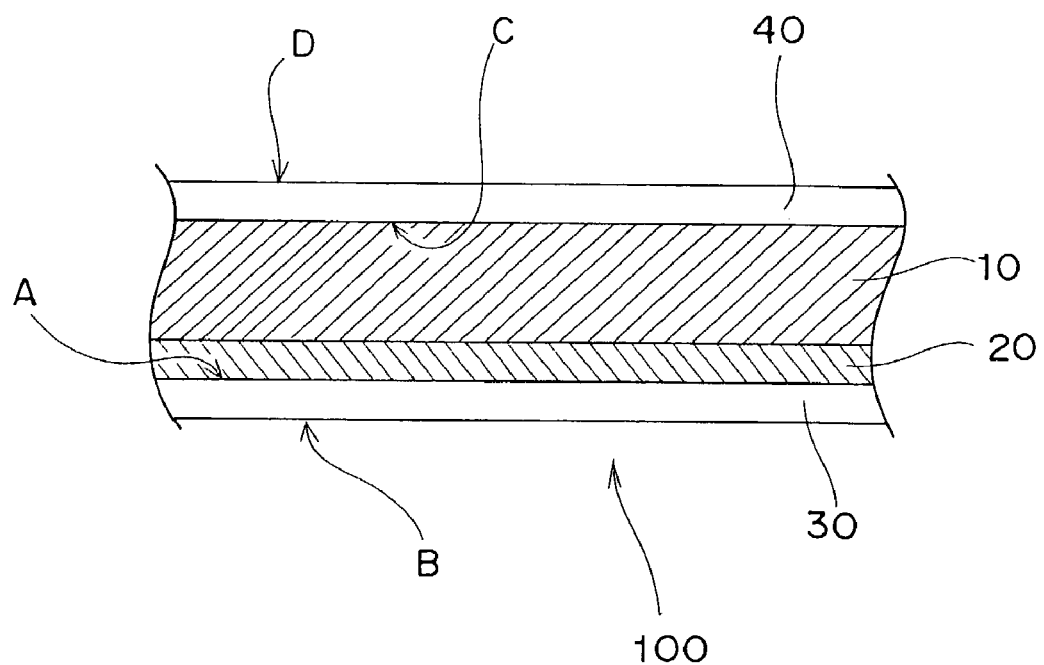
FIG. 1 is a schematic sectional view illustrating a construction of a laminate when employing a method for producing an optical information recording medium according to a second aspect of the invention.

The present invention will be explained in detail with reference to preferable embodiments.

First Embodiment

An optical information recording medium according to the first aspect of the invention comprises a substrate having disposed thereon optionally a light-reflective layer, a recording layer, an interlayer, a pressure sensitive adhesive layer and a cover film, in which information can be recorded and reproduced by irradiating laser light and the pressure sensitive adhesive layer contains a polymer having a glass transition temperature Tg of 0° C. or less. Each of the layers in the optical information recording medium according to the first aspect of the invention is described in detail below. "Cover layer" to be described later is a layer that includes the pressure sensitive adhesive layer and the cover film.

(Optical Information Recording Medium)

Substrate

Materials conventionally used for optical information recording media substrate can be arbitrarily selected and used as the material for the substrate of the invention.

Specific examples of such substrate materials include glass, polycarbonate, acrylic resins such as polymethyl methacrylate, vinyl chloride-based resins such as polyvinyl chloride and copolymers of vinyl chloride, epoxy resins, amorphous polyolefins, polyesters and metals such as aluminum. If necessary, these materials may be used in combination.

Among the materials listed above, amorphous polyolefins and polycarbonate are more preferable from the standpoints of moisture resistance, dimension stability and low cost. Polycarbonate is particularly preferable. The thickness of the substrate is preferably 1.1 ±0.3 mm.

A guide groove for tracking or a pre-groove representing information such as address signals is formed on the substrate. In order to achieve higher storage density, it is preferable to use a substrate having a pre-groove with a track pitch that is narrower than the track pitch in a conventional CD-R or DVD-R. It is suitable that the track pitch of the pre-groove is 200 to 400 nm, and preferably 250 to 350 nm. It is also suitable that the depth of the pre-groove (groove depth) is 20 to 150 nm, and preferably 30 to 100 nm.

An undercoat layer is preferably disposed on the surface of the substrate at the side disposed with the light-reflective layer, in order to improve surface smoothness and enhance adhesion.

Examples of the material for the undercoat layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate and the like; and surface-modifying agents such as silane coupling agents.

The undercoat layer can be formed by preparing a coating solution by dissolving or dispersing the above-mentioned material in a suitable solvent, and applying the coating solution to the substrate surface by spin coating, dip coating, extrusion coating, or the like. The thickness of the undercoat layer is normally 0.005 to 20 μm, and preferably 0.01 to 10 μm.

Light-Reflective Layer

In the invention, any material having a high reflectance, preferably over 70%, with respect to lasers may be used for the light-reflective layer.

Examples of the light-reflective substance having the high reflectance with respect to lasers include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and stainless steel. These light-reflective substances may be used singly or in combination of two or more, or alternatively as alloys. Among these materials, Cr, Ni, Pt, Cu, Ag, Au, Al, and stainless steel are preferable. Au, Ag, Al and their alloys are particularly preferable. Au, Ag and their alloys are most preferable.

The light-reflective layer can be formed by, for example, vacuum-depositing, sputtering or ion-plating the light-reflective substance described later on the substrate.

The thickness of the light-reflective layer is preferably 10 to 300 nm, and more preferably 50 to 200 nm.

Incidentally, the light-reflective layer needs not necessarily be formed when the recording layer exhibits sufficient reflection and serves as the light-reflective layer.

Recording Layer

The recording layer is formed on the light-reflective layer and information can be recorded on the recording layer by irradiating a laser beam having a wavelength of 380 to 500 nm through an objective lens having an NA of 0.7 or higher.

The recording layer preferably contains organic dyes. Examples of the dye contained in the recording layer include cyanine-based dyes, oxonol-based dyes, metal complex-based dyes, azo-based dyes, phthalocyanine-based dyes, benzotriazole-based dyes and aminobutadiene-based dyes, among which phthalocyanine-based dyes benzotriazole-based dyes and aminobutadiene-based dyes are preferable.

In addition, the organic dyes described in JP-A Nos. 4-74690, 8-127174, 11-53758, 11-334204, 11-334205, 11-334206, 11-334207, 2000-43423, 2000-108513 and 2000-158818 can suitably be used.

The recording layer is formed by preparing a coating solution by dissolving a recording material such as a dye together with a binder and the like in a suitable solvent, and applying the coating solution to the substrate or the light-reflective layer formed on the substrate surface to form a layer, followed by drying the layer. The concentration of the recording material in the coating solution is normally 0.01 to 15% by mass, preferably 0.1 to 10% by mass, more preferably 0.5 to 5% by mass, and most preferably 0.5 to 3% by mass.

Examples of the solvent for preparing the dye coating solution include esters such as butyl acetate, ethyl lactate and cellosolve acetate; ketones such as methyl ethyl ketone, cyclohexanone and methyl isobutyl ketone; chlorinated hydrocarbons such as dichloroethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol and n-butanol diacetone alcohol; fluorine-based solvents such as 2,2,3,3-tetrafluoropropanol; glycol ethers such as ethylene glycol monomethyl ether, ethylene glycol monoethyl ether and propylene glycol monomethyl ether.

These solvents may be used singly or in combination of two or more, by taking into consideration of solubility of the recording material to be used. The dye coating solution may also contain additives such as an antioxidant, a UV absorber, a plasticizer and a lubricant depending on the use purposes.

If a binder is used, examples of the binder include naturally occurring organic polymeric substances such as gelatin, cellulose derivatives, dextran, rosin and rubber; and synthetic organic polymers, for example, hydrocarbon-based resins such as polyethylene, polypropylene, polystyrene and polyisobutylene; vinyl-based resins such as polyvinyl chloride, polyvinylidene chloride and vinyl chloride/polyvinyl acetate copolymers; acrylic resins such as polymethyl acrylate and polymethyl methacrylate; polyvinyl alcohol, chlorinated polyethylene, epoxy resins, butyral resins, rubber derivatives, and pre-condensates of heat-curable resins, e.g., phenol/formaldehyde resins. If the binder is used together with the recording material in the recording layer, the amount of the binder is generally 0.01 to 50 times (by mass ratio), and preferably 0.1 to 5 times (by mass ratio), relative to the recording material. The concentration of the recording material in the coating solution thus prepared is generally 0.01 to 10% by mass, and preferably 0.1 to 5% by mass.

The dye solution may be coated by spraying, spin coating, dip coating, roll coating, blade coating, doctor roll coating, or screen printing.

The recording layer may comprise a single layer or several layers. The thickness of the recording layer is usually 20 to 500 nm, preferably 30 to 300 nm, and more preferably 50 to 100 nm.

When the optical information recording medium according to the first aspect of the invention is produced, the coating is conducted at temperatures of from 23 to 50° C. without any problem, preferably from 24 to 40° C., and more preferably from 25 to 37° C. In order to raise lightfastness of the recording layer, various kinds of anti-fading agents may be incorporated in the recording layer.

Generally, a singlet oxygen quencher is used as the anti-fading agent. Singlet oxygen quenchers already described in publications such as patent specifications can be used.

Specific examples of the singlet oxygen quencher include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492, Japanese Patent Application Publication (JP-B) Nos. 1-38680 and 6-26028, German Patent No. 350399, and *Journal of the Chemical Society of Japan*, October 1992, p.1141.

The amount of the anti-fading agent such as the singlet oxygen quencher is usually 0.1 to 50% by mass, preferably 0.5 to 45% by mass, more preferably 3 to 40% by mass, and particularly preferably 5 to 25% by mass, relative to the amount of the dye used.

The recording layer contains organic compounds such as dyes. Alternatively, the recording layer may be a phase transition recording layer on which information is recorded utilizing the phase change or a photo-magnetic recording layer on which information is recorded utilizing photo-magnetism. In the phase transition recording layer, metal compounds such as Sb, Te, Ag, In and chalcogenides may be used as the recording material.

Cover Layer

The cover layer is formed in the invention to prevent water from penetrating into the interior of the optical information recording medium. In the optical information recording medium according to the first aspect of the invention, the cover layer comprises the pressure sensitive adhesive layer containing a polymer having a glass transition temperature Tg of 0° C. or lower and the cover film.

In the optical information recording medium according to the first aspect of the invention, when laser light is irradiated for recording information, the organic dye in the recording layer decomposes to alter refractive index, whereby pits are formed. At this point, if the pressure sensitive adhesive layer is deformed via an interlayer to be described later by the generated heat, refractive index is altered by the deformation, which leads to a large modulation degree and hence provides excellent recording characteristics.

Further, in the optical information recording medium according to the first aspect of the invention, the interlayer can be made thinly since the organic dyes are prevented from being eluted than the case where a liquid UV-curable adhesive for adhering the cover film is used, and accordingly, an improved reflectance can be achieved.

In the optical information recording medium according to the first aspect of the invention, there is no particular limitation on the material to form the cover film so long as it is a transparent material. The material is preferably polycarbonate, cellulose triacetate and acrylic polymers. The material preferably has a hygroscopicity of 5% or less at 23° C. and 50% RH. Further, the cover film preferably has a surface roughness of 5 nm or less and preferably has double refractive index of 10 nm or less.

"Transparent" as used herein means that the material is transparent enough to transmit laser light for recording and reproducing information (transmittance: 80% or more).

The thickness of the cover layer is preferably within a range from 0.01 to 0.2 mm, more preferably within a range from 0.03 to 0.1 mm, and further preferably within a range from 0.05 to 0.095 mm.

Examples of the polymer having a glass transition temperature Tg of 0° C. or lower used in the pressure sensitive adhesive layer include acrylic polymers, methacrylate-based polymers, rubber-based polymers, silicone-based polymers and urethane-based polymers, among which acrylic polymers and methacrylate-based polymers are preferable in view of transparency and durability.

As the polymer, the polymers having the glass transition temperature Tg of −20° C. or lower are preferable and the polymers having the glass transition temperature of −30° C. or lower are more preferable.

The content of the polymer in the pressure sensitive adhesive layer is preferably from 50 to 99% by mass, and more preferably from 80 to 99% by mass based on the total mass of the pressure sensitive adhesive layer after drying.

As the acrylic polymer and the methacrylate-based polymer, those containing 2-ethylhexyl acrylate or n-butyl acrylate as a main ingredient and copolymerized with a short-chain alkyl acrylate or methacrylate, for example, methyl acrylate, ethyl acrylate or methyl methacrylate for improving the agglomeration and acrylic acid, methacrylic acid, acrylamide derivative, maleic acid, hydroxyethyl acrylate or glycidyl acrylate that forms crosslinking sites with a crosslinking agent are used. The glass transition temperature Tg or the crosslinked density can be changed by altering the proportion and the species of the main ingredient and the short-chain ingredients for providing crosslinking sites.

Further, the solvent for dissolving the acrylic polymer can be selected arbitrarily in accordance with the polymer used, and examples thereof include ethyl acetate, butyl acetate, toluene, methylethylketone and cyclohexane.

Preferably, the pressure sensitive adhesive layer further contains an isocyanate-type crosslinking agent. Examples of the isocyanate-type crosslinking agent usable in the invention include polyisocyanates, for example, isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, or the products of the above isocyanates and polyalcohols, or polyisocyanates formed by condensing isocyanates. Commercially available products of such isocyanates include, for example, COLONATE L, COLONATE HL, COLONATE 2030, COLONATE 2031, MILLIONATE MR and MILLIONATE HTL produced by Nippon Polyurethane Co; TAKENATE D-102, TAKENATE D-110N, TAKENATE D-200, and TAKENATE D-202 produced by Takeda Yakuhin Co.; and DESMODULE L, DESMODULE IL, DESMODULE N, and DESMODULE HL, produced by Sumitomo Bayer Co.

In the optical information recording medium according to the first aspect of the invention, the method for forming the cover layer from the pressure sensitive adhesive layer and the cover film includes the steps of coating a pressure sensitive adhesive on the cover film, drying the solvent, then disposing the cover film via the pressure sensitive adhesive on the interlayer, applying a pressure by means of a roller and laminating the cover film.

The thickness of the pressure sensitive adhesive layer in forming the cover layer from the pressure sensitive adhesive layer and the cover film is preferably within a range from 1 to 200 μm, more preferably within a range from 5 to 10 μm, and particularly preferably within a range from 10 to 50 μm in order to provide elasticity.

The temperature of coating the pressure sensitive adhesive is preferably within a range from 23 to 50° C., more preferably within a range from 24 to 40° C. and, further preferably within a range from 25 to 37° C. for controlling the viscosity. After the coating, the adhesive is dried preferably at 50 to 300° C., more preferably at 80 to 200° C., and further preferably at 100 to 150° C. In addition, the temperature employed when the cover film is adhered to the recording layer is preferably within a range from 0 to 100° C., and more preferably within a range from 15 to 50° C.

The cover layer can be formed by coating the pressure sensitive adhesive on the releasable film that has releasability to the pressure sensitive adhesive used, drying the solvent, then overlaying the cover film, and further peeling the releasable film, to thereby dispose the pressure sensitive adhesive on the cover film and laminating it on the interlayer.

Particularly, in case where the solvent contained in the pressure sensitive adhesive dissolves the cover film, the above method is preferably employed.

If a sheet in which the pressure sensitive adhesive layer is disposed on the releasable film is used, there is no particular limitation on the film that is used as the substrate so long as it is insoluble in the solvent contained in the pressure sensitive adhesive and, for example, a plastic film such as made of polyethylene terephthalate, polypropylene, polyethylene and vinyl chloride, paper such as craft paper, high quality paper, clay coated paper and Japanese paper, non-woven fabric such as made of rayon and polyester, woven fabric made of synthetic fibers such as polyester, nylon and acryl, and metal foils such as of aluminum, copper or stainless steel can be used, among which the plastic film is preferable from the standpoint of coating the releasable layer on the film continuously, thinly and uniformly.

Further, as the releasing agent to be used, various kinds of conventional releasing agents such as silicone-based releasing agent or long-chain alkyl-type releasing agent can properly be selected and used.

Interlayer

The interlayer is formed between the recording layer and the cover layer to prevent the organic dye contained in the recording layer from being eluted to the side provided with the cover layer. In the invention, the interlayer can be formed thinly as descried above, and specifically, the layer can be made to have the thickness of 1-50 nm, and preferably 1-30 nm.

There is no particular limitation on the material constituting the interlayer so long as the material can transmit laser light. Dielectric materials are preferably used. More specifically, examples of the material include inorganic oxides, nitrides and sulfides such as $ZnS$, $TiO_2$, $SiO_2$, $ZnS-SiO_2$, $GeO_2$, $Si_3N_4$, $Ge_3N_4$ and $MgF_2$, among which $ZnS-SiO_2$ or $SiO_2$ is preferable

[Method for Recording and Reproducing Information Using Optical Information Recording Medium according to the First Aspect of the Invention]

Next, the method for recording and reproducing information using the optical information recording medium according to the first aspect of the invention is described.

Information is recorded on the optical information recording medium, for example, as described below.

First, while rotating the optical information recording medium at a constant linear velocity (1.2-1.4 m/sec in case of CD format) or at a constant angular velocity, laser light for recording information is irradiated from the side provided with the cover layer. By irradiating the laser light, the recording layer absorbs the light to locally induce elevated temperature and cause a physical or chemical change (for example, formation of pits) to alter the optical characteristics, whereby information is recorded.

Examples of the laser light source having an oscillation wavelength of 380 to 500 nm include a blue-violet semiconductor laser having an oscillation wavelength from 390 to 415 nm, a blue-green semiconductor laser having a central oscillation frequency of 515 nm, and a blue-violet SHG laser having a central oscillation wavelength of 425 nm comprising an infrared semiconductor laser having a central oscillation wavelength of 850 nm and an optical waveguide type wavelength converting device (SHG). In order to improve recording density, use of the blue-violet semiconductor laser or the SHG laser capable of obtaining a laser beam having a shorter wavelength is particularly preferable. In order to further improve recording density, it is essential that the objective lens used for pick-up has the numerical aperture (NA) of of 0.7 or higher, and more preferably 0.85 or higher.

Then, the recorded information can be reproduced by irradiating laser light from the side provided with the cover layer while rotating the optical information recording medium at a constant linear velocity identical to the velocity described above, and detecting the reflected light.

Second and Third Embodiments

Next, a method for producing an optical information recording medium according to the second aspect of the invention and an optical information recording medium produced by the production method according to the third aspect of the invention are described below.

Hereinafter, the characteristic features in the procedure for preparing the cover layer in the method for producing the optical information medium according to the second aspect of the invention are detailed.

In the procedure, the cover layer is prepared at least through the steps of (a) forming a laminate by successively superimposing a first releasable film, a pressure sensitive adhesive layer, a cover film and a second releasable film; and (b) winding the laminate into a roll.

Description will now be made on each of the steps.

[(a)Step of Forming a Laminate by Successively Superimposing First Releasable Film, Pressure Sensitive Adhesive Layer, Cover Film and Second Releasable Film]

A laminate 100 formed by this step has a construction as shown in FIG. 1, in which the cover film 10 provided with the pressure sensitive adhesive layer 20 is sandwiched between the first releasable film 30 and the second releasable film 40. FIG. 1 is a schematic sectional view to illustrate the construction of the laminate.

The first releasable film 30 used in the step (a) is to be adhered to the surface of the pressure sensitive adhesive layer (adhesive surface), and it is necessary that the central surface average roughness (SRa) of a surface of the film, surface A, that is abutted on the surface of the pressure sensitive adhesive layer is 50 nm or less, and the central surface average roughness (SRa) of the other surface, surface B, is 100 nm or less, and the film has the thickness of 20 μm or more.

More preferably, the central surface average roughness (SRa) of the surface A of the film is 40 nm or less, the central surface average roughness (SRa) of the surface B is 80 nm or less and the film has the thickness of 25 μm or more. Still more preferably, the central surface average roughness (SRa) of the surface A of the film is 30 nm or less, the central surface average roughness (SRa) of the surface B is 60 nm or less, and the film has the thickness of 30 μm or more.

The central surface average roughness (SRa) is a value obtained by setting the orthogonal ordinate axes X and Y on the central surface of a roughened curved surface and calculated by assuming the axis perpendicular to the central surface as Z axis, the roughened curved surface as f(x, y) and the size of the reference surface as Lx and Ly.

If the surface roughness of the surface A of the first releasable film 30 is specified within the range described above, the surface roughness of the surface A of the first releasable film 30 prevents the film from being directly transferred to the pressure sensitive adhesive layer. Further, if the surface roughness and the thickness of the surface B of the first releasable film 30 are specified as above, it is possible to reduce the adverse effects of the surface roughness of the surface B of the first releasable film 30 and the surface roughness of the second releasable film 40 exerted indirectly on the surface roughness of the pressure sensitive adhesive layer. Thus, the optical information recording medium according to the invention is free from occurrence of surface displacement or uneven thickness caused by the surface roughness of the pressure sensitive adhesive layer and exerts good adhesiveness, and accordingly, it can eventually obtain sufficient recording characteristics and durability.

On the other hand, the second releasable film 40 used in the step (a) is adhered to the surface of the cover film via an adhesive layer or a thin pressure sensitive adhesive layer (not shown). Usually, the cover film 10 used in the cover layer is required to have surface smoothness in order to prevent scattering of irradiated light. If the surface smoothness is excessively high, it often causes disturbed winding upon winding into a roll or causes handling failure in the slitting or punching step. Accordingly, good handling characteristics to facilitate winding operation is imparted to the surface of the cover film 10 by arranging the second releasable film 40 having a large surface roughness at the surface D.

Further, the second releasable film 40 preferably has a smooth surface C in order to improve adhesiveness to the cover film 10.

Specifically, it is preferable that the second releasable film 40 has a central surface average roughness (SRa), on the surface C that is abutted on the cover film, of 50 nm or less, and a central surface average roughness (SRa) on the other surface D, of 200 nm or more. Further, the thickness is preferably from 10 to 100 μm.

As the first releasable film 30 and the second releasable film 40, a polyethylene film, a polypropylene film, a polyethylene terephthalate film, a vinyl chloride film or a vinylidene chloride film can suitably be used. In order to achieve a desired surface roughness as described above for the films, any conventionally known method can be employed, by properly adjusting the film forming conditions (stretching degree or speed), the use amount, the size and the shape of fillers incorporated in the film.

There is no particular limitation on the method for disposing the pressure sensitive adhesive layer 20 on the surface of the cover film 10. Since the method includes the step of winding the laminate 100 into a roll to be described later in (b), the cover film 10 used preferably has a continuous length sufficient to be wound into a roll, and the pressure sensitive adhesive layer is preferably disposed continuously on the surface of the cover film.

Specifically, the method is generally divided into two types of a method of adhering a previously formed pressure sensitive adhesive layer 20 to the surface of the cover film 10 (hereinafter, sometimes referred to as an indirect method), and a method of directly coating a pressure sensitive adhesive on the surface of the cover film 10 and then drying the same to form the pressure sensitive adhesive layer 20 (hereinafter referred to as a direct method). Commercially available pressure sensitive adhesive films previously disposed with a pressure sensitive adhesive layer 20 may also be used.

When the indirect method is employed, the pressure sensitive adhesive layer can be adhered continuously to the surface of the cover film by means of an apparatus for providing a pressure sensitive adhesive layer, for example, as shown in FIG. 2. FIG. 2 is a schematic side view of the apparatus for providing the pressure sensitive adhesive layer used in a typical embodiment for the method of continuously disposing the pressure sensitive adhesive layer on the surface of the cover film. This apparatus can also conduct the step (b) of winding a laminate 100, to be described later, into a roll within the apparatus.

As shown in FIG. 2, the apparatus for providing the pressure sensitive adhesive layer comprises a roll 1 of a releasable film $f_1$, a coating device 2, a drier 3, a roll 4 of a cover film $f_2$ (cover film 10), and a roll 5 to wind the releasable film $f_1$ provided with the pressure sensitive adhesive layer together with the cover film $f_2$.

When operating the apparatus for providing the pressure sensitive adhesive layer, the releasable film $f_1$ is at first delivered in the direction of an arrow from the roll 1 around which the releasable film $f_1$ is to be wound. When a control section (not shown) senses delivering of the top end of the releasable film $f_1$ conveyed to a predetermined region (coating section), coating of an adhesive coating solution previously prepared is started onto the surface of the releasable film $f_1$ (coating step). Thus, the releasable film $f_1$ provided with the pressure sensitive adhesive layer is obtained. The adhesive coating step is continued until the delivery of the releasable film $f_1$ of the roll 1 to the final end thereof.

When the control section (not shown) senses delivering of the releasable film $f_1$ provided with the pressure sensitive adhesive layer to the drying section, the adhesive coated layer is dried by the drier 3 located in the drying section (drying step). Through this step, the solvent present in the adhesive coated layer is evaporated off to form the releasable film $f_1$ which is provided with the pressure sensitive adhesive layer. Then, the releasable film $f_1$ provided with the pressure sensitive adhesive layer is further conveyed and adhered to the cover film $f_2$ delivered from the roll 4, such that the surface of the cover film $f_2$ is abutted on the pressure sensitive adhesive layer in the laminating section a (laminating step). Then, the releasable film $f_1$ provided with the pressure sensitive adhesive layer and the cover film $f_2$ are wound together round the roll 5 (winding step). In the apparatus for providing the pressure sensitive adhesive layer, a series of the steps described above are conducted continuously until the releasable film $f_1$ in the form of a roll is delivered from the roll 1 and then wound to the roll 5.

In the apparatus for providing the pressure sensitive adhesive layer, any conventionally known coating methods can be adopted for the coating device 2, and specifically, the methods include, for example, spraying, roll coating, blade coating, doctor roll and screen printing.

Additional conventionally known drying methods such as heat-drying or blow-drying can be adopted for the drier 3.

As the releasable film $f_1$ used in the apparatus for providing the pressure sensitive adhesive layer in the indirect method, a film having the same surface property and thickness as those of the first releasable film 30 may be used and functioned as it is as the first releasable film 30, or alternatively the releasable film f, may be peeled off before winding around the roll 5, and additionally, a first releasable film 30 may be adhered thereto.

Further, on the surface of the cover film $f_2$ used in the apparatus for proving the pressure sensitive adhesive layer, not provided with the pressure sensitive adhesive layer in the indirect method, may be formed previously with another second releasable film 40 or may be adhered to the second releasable film 30 before being wound around the roll 5.

As the cover film $f_2$ in the form of a roll, those formed by winding a film having 130 mm width and 200 m length around a shaft of 75 mmφ can be used.

In the apparatus for providing the pressure sensitive adhesive layer used in the indirect method, when the step (a) and the step (b) to be described later are continuously conducted, it is preferable to use the releasable film $f_1$ that can function as it is as the first releasable film 30 and to dispose beforehand the second releasable film 40 on the cover film $f_2$ not provided with the pressure sensitive adhesive layer.

The direct method is employed by delivering a rolled cover film, continuously coating an adhesive coating solution from the top end to the final end of the cover film to form the pressure sensitive adhesive coated layer and then successively drying the coated layer, to thereby form the pressure sensitive adhesive layer over the entire surface area on one side of the cover film.

Subsequently, the first releasable film 30 is adhered to the surface of the pressure sensitive adhesive layer (pressure sensitive adhesive surface) and the second releasable film 40 is adhered to the surface of the cover film, respectively, to thereby give a laminate 100.

During the coating and drying steps in the direct method, the same coating devices and dryers as those used in the apparatus for providing the pressure sensitive adhesive layer can be used.

The cover film 10 (cover film $f_2$) used in the step (a) in the method for producing an optical information recording medium according to the second aspect of the invention, there is no particular limitation so long as it is a film of transparent material, similarly to the optical information recording medium according to the first aspect of the invention. It is preferable to use polycarbonate and acrylic resins such as polymethyl methacrylate; vinyl chloride-based resins such as polyvinyl chloride and vinyl chloride copolymer; epoxy resins; amorphous polyolefin; polyester; cellulose triacetate, among which polycarbonate or cellulose triacetate is preferably used.

"Transparent" as used herein means that transmittance is 80% or more with respect to light used for recording and reproducing information.

The cover film 10 may contain various kinds of additives insofar as the additive does not hinder the effect of the invention. For example, the film may include a UV absorbent for shading light at a wavelength of 400 nm or less and/or a pigment for shading light at a wavelength of 500 nm or more.

In view of physical properties of the surface of the cover film 10, it is preferable that the surface roughness is 5 nm or less for both of two-dimensional roughness parameter and three-dimensional roughness parameter. Further, in order to condense light beams used for recording and reproducing information, the double refractive index of the cover film 10 is preferably 10 nm or less.

The thickness of the cover film 10 is preferably within a range of from 0.03 to 0.15 mm and, more preferably within a range of from 0.05 to 0.12 mm. Such a range provides an advantage of facilitating handling in the step of laminating the cover film 10 and suppressing coma aberration.

As the pressure sensitive adhesive contained in the pressure sensitive adhesive layer formed in the step (a), acrylic, rubber or silicone-based pressure sensitive adhesives can be used, among which acrylic pressure sensitive adhesives are preferable in view of transparency and durability. As the acrylic pressure sensitive adhesive, pressure sensitive adhesives comprising 2-ethylhexyl acrylate or n-butyl acrylate as a main ingredient and copolymerized, for example, with short-chain alkyl acrylates or methacrylates such as methyl acrylate, ethyl acrylate or methyl methacrylate in order to improve agglomeration, and acrylic acid, methacrylic acid, acrylamide derivative, maleic acid, hydroxyethyl acrylate or glycidyl acrylate that forms crosslinking sites with a crosslinking agent. The glass transition temperature (Tg) and the crosslinked density can be changed by properly controlling the mixing ratio and the kinds of the main ingredient used, and the short-chain ingredients for providing the crosslinking sites.

The pressure sensitive adhesive is preferably mixed with a crosslinking agent for improving adhesion and durability. Examples of the crosslinking agent include isocyanate resin-type crosslinking agent, epoxy resin-type crosslinking agent, melamine resin-type crosslinking agent, urea resin-type crosslinking agent and chelate-type crosslinking agent. Among the above-listed, isocyate-based crosslinking agent is more preferable. Examples of the isocyanate-type crosslinking agents usable in the invention include isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate, triphenylmethane triisocyanate, or the products of the above isocyanates and polyalcohols, or polyisocyanates formed by condensing the isocyanates. Commercially available products of such isocyanates include, for example, COLONATE L, COLONATE HL, COLONATE 2030, COLONATE 2031, MILLIONATE MR and MILLIONATE HTL produced by Nippon Polyurethane Co; TAKENATE D-102, TAKENATE D-110N, TAKENATE D-200, and TAKENATE D-202 produced by Takeda Yakuhin Co.; and DESMODULE L, DESMODULE IL, DESMODULE N, and DESMODULE HL, produced by Sumitomo Bayer Co.

[(b) Step of Winding a Laminate into a Roll]

The laminate 100 formed by the direct method in the step (a) above, or the laminate 100 formed by laminating a commercially available pressure sensitive adhesive sheet with the first releasable film 30 and the second releasable film 40 is wound into a roll in this step to thus provide the laminate 100 having an improvement over the laminate in the shape of a plate in an identical quantity, from the standpoints of readily transporting and easy delivery.

Further, the step (a) and the step (b) are performed continuously by the apparatus for providing the pressure sensitive adhesive layer and the resultant laminate 100 can be removed easily from the apparatus and transported readily to additional steps described later.

[Additional Step for Producing a Cover Layer]

(Laminate is maintained until substantial completion of crosslinking reaction in pressure sensitive adhesive layer)

This step in the method for producing the optical information recording medium according to the second aspect of the invention is a step of making the adhesiveness of the pressure sensitive adhesive layer and adhesion thereof with the laminating surface of the recording layer or the interlayer excellent and improving durability for suitably use as the optical information recording medium.

In this step, the laminate 100 wound into a roll during the step (b) is maintained until the crosslinking reaction in the pressure sensitive adhesive layer is substantially completed.

"Until the crosslinking reaction in the pressure sensitive adhesive layer is substantially completed" as used herein means "until the peaks attributable to functional groups responsible for crosslinking of the crosslinking agent used, when the pressure sensitive adhesive layer is measured by infrared spectral absorption spectrometry, substantially disappear", which point is properly controlled in accordance with the thickness of the pressure sensitive adhesive layer, the pressure sensitive adhesive to form the pressure sensitive adhesive layer, the kind of the crosslinking agent or the atmosphere maintained in the space (temperature and humidity).

For example, the duration corresponding to "until substantial completion of the crosslinking reaction in the pressure sensitive adhesive layer (X)" can be determined by putting the pressure sensitive adhesive layer (X) formed of an acrylic pressure sensitive adhesive as the pressure sensitive adhesive and an isocyanate-type crosslinking agent in an atmosphere of 23° C. and a humidity of 50%RH and measuring the infrared adsorption spectrum of the pressure sensitive adhesive layer with lapse of time and measuring the duration until an absorption peak occurring near 2275-2250 $cm^{-1}$ attributable to isocyanate observed before keeping (immediately after coating) substantially disappears.

The duration corresponding to the phrase "until substantial completion of crosslinking reaction in pressure sensitive adhesive layer" obtained as above is specifically 72 hours in an ordinal circumstance at room temperature (temperature: 21-30° C., humidity; 30-80% RH). Accordingly, the cover film provided with the pressure sensitive adhesive layer in such a circumstance has to be kept for 72 hours or more.

(Step of Punching a Laminate into Disc-Shape)

This is a step of punching the laminate into a predetermined size, that is, to a disc shape of an identical size with that of a substrate to be described later.

More specifically, the laminate 100 is delivered, in the state of temporarily having a planar shape, and continuously punched into the same size as the substrate, for example, by using a cutting punch.

Then, the laminate 100 other than the punched portions is again wound into a roll, whereby wastes produced by punching can be recovered easily.

(Step of Piling Disc-Shape Laminates in Substantially Vertical or Horizontal Direction)

This step is conducted to straighten strains such as curling, winding tendency and anisotropy occurring in the laminates 100. The methods for piling and maintaining the disc-shape laminates 100 include, for example, a method for maintaining the disc-shape laminates 100 in the state of substantially vertically piled and then straightening strains by applying a load to the laminates 100 in the vertical direction. Alternatively, strains may be straightened by maintaining the laminates 100 in the state of substantially horizontally piled nature and by their own weight or by applying a load in a gravitational direction.

Strains such as curling, winding tendency and anisotropy in the disc-shape laminates 100 can be straightened by piling them in this state for a predetermined period of time, for example, one hour. The piling time is properly controlled depending on the thickness of the cover film, the thickness of the pressure sensitive adhesive layer, the kind of the pressure sensitive adhesive to constitute the pressure sensitive adhesive layer, the crosslinking agent and other additives, and the atmosphere for piling in the space (temperature and humidity).

As described above, by employing the production method according to the second aspect of the invention, the cover layer of the optical information recording medium exerts an excellent effect of reduced unevenness of thickness and incidences of air bubble contamination since the surface roughness is small. Further, since the step of preparing the cover layer is entirely conducted continuously and has excellent transporting property together with easy recovery of wastes, an advantage of excellent producibility can also be provided. Furthermore, since the cover layer prepared by various steps described above exhibits good adhesion to the laminating surface of the recording layer or the interlayer and strains such as curling, winding tendency and anisotropy can be straightened in addition to the effects described above, incidences of surface unevenness or unevenness of thickness can be reduced further.

An optical information recording medium according to the third aspect of the invention is produced by peeling the first releasable film, adhering the cover layer to the surface of the recording layer formed on the substrate such that the pressure sensitive adhesive layer is abutted on the surface and then the second releasable film is peeled off. The optical information recording medium thus formed according to the third aspect of the invention exhibits excellent recording characteristics and durability.

The method for producing the optical information recording medium according to the second aspect of the invention may include various known steps, in addition to the step of preparing the cover layer, such as a light-reflective layer forming step to dispose the light-reflective layer on the substrate and a recording layer forming step to dispose the recording layer on the light-reflective layer.

<Light-Reflective Layer Forming Step>

The light-reflective layer forming step is a step of forming a light-reflective layer containing a light-reflective substance on the surface of the substrate which includes pre-grooves to be described later.

Various kinds of materials used as the conventional substrate materials for substrates in optical information recording media can arbitrarily be selected and used for the substrate in a similar manner to the first aspect.

Specifically, the materials include, for example, glass; polycarbonates and acrylic resins such as polymethyl methacrylate; vinyl chloride-based resins such as polyvinyl chloride and vinyl chloride copolymers; epoxy resins; amorphous polyolefins; polyesters; and metals such as aluminum, which may be optionally used in combination.

Among the above-listed materials, amorphous polyolefins or polycarbonates are preferred and polycarbonates are particularly preferable in view of the moisture resistance, dimensional stability and reduced cost. Further, the thickness of the substrate is preferably 1.1 ±0.3 mm.

In the substrate, a guide groove for tracking or a pre-groove for representing information such as address signals is formed. For achieving higher recording density, pre-grooves having a narrower track pitch are required as compared with CD-R or DVD-R. For example, when used as a medium such as DVR-blue, the track pitch of the pre-grooves is essentially within a range of 200 to 400 nm, and preferably within a range of 250 to 350 nm. Further, the depth of the pre-groove (groove depth) is within a range of from 20 to 150 nm, and preferably within the range of from 50 to 100 nm.

An undercoat layer is preferably formed on the surface of the substrate at the side provided with the light-reflective layer to be described later, with an aim of improving flatness and enhancing adhesiveness.

Examples of the material for the undercoat layer include high molecular materials such as polymethyl methacrylate, acrylic acid/methacrylic acid copolymer, styrene/maleic acid anhydride copolymer, polyvinyl alcohol, N-methylol acrylamide, styrene/vinyl toluene copolymer, chlorosulfonate polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and surface modifying agents such as silane coupling agent.

The undercoat layer can be formed by dissolving or dispersing the material described above in an appropriate solvent to prepare a coating solution and then coating the coating solution to a substrate surface by a coating method such as spin coating, dip coating or extrusion coating. The thickness of the undercoating layer is generally within a range of 0.005 to 20 μm, and preferably within a range of from 0.01 to 10 μm.

The light-reflective layer can be formed on the substrate by vapor depositing, sputtering or ion plating a light-reflective substance having a high reflectance with respect to laser light on the substrate. The thickness of the light-reflective layer is generally within a range of from 10 to 300 μm, and preferably within a range of 50 to 200 nm. The reflectance is preferably 70% or more.

Examples of the light-reflective substance exhibiting the high reflectance include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi or stainless steels. Such light-reflective substances may be used alone or in combination of two or more thereof, or as the alloy. Among them, preferred are Cr, Ni, Pt, Cu, Ag, Au, Al, and stainless steels. Particularly preferred is Au, Ag, Al or the alloy thereof. Most preferred is Au, Ag or the alloy thereof.

<Recording Layer Forming Step>

The recording layer forming step is a step to form a recording layer on the light-reflective layer. Information can be recorded on the recording layer by irradiating laser light having a wavelength of 600 nm or less and the layer preferably contains a dye as the recording material. Examples of the dye incorporated in the recording layer include cyanine dyes, oxonol dyes, metal complex-based dyes, azo dyes and phthalocyanine dyes.

Additional dyes described in, for example, JP-A-Nos. 4-74690, 8-127174, 11-53758, 11-334204, 11-334205, 11-334206, 11-334207, 2000-43423, 2000-108513 and 2000-158818 may be preferably used.

The recording layer is formed by dissolving the recording material such as the dye together with a binder or the like in an appropriate solvent to prepare a coating solution, then coating the coating solution on the light-reflective layer formed on the surface of the substrate to form a coating layer and then drying the same. The concentration of the recording material in the coating solution is generally within a range of 0.01 to 15% by mass, preferably within a range of from 0.1 to 10% by mass, more preferably within a range of from 0.5 to 5% by mass, and most preferably within a range of from 0.5 to 3% by mass.

Examples of the solvent for preparing the coating solution include esters such as butyl acetate, ethyl lactate and cellosolve acetate; ketones such as methyl ethyl ketone, cyclohexanone, methyl isobutyl ketone; chlorinated hydrocarbons such as dichloromethane, 1,2-dichloroethane and chloroform; amides such as dimethylformamide; hydrocarbons such as methyl cyclohexane; ethers such as tetrahydrofuran, ethyl ether and dioxane; alcohols such as ethanol, n-propanol, isopropanol and n-butanol diacetone alcohol; fluorine-based solvent such as 2,2,3,3-tetrafluoropropanol; and glycol ethers such as ethylene glycol monomethyl ether, ethylene glycol monoethyl ether and propylene glycol monomethyl ether.

The solvent can be used alone or in combination of two or more thereof in consideration of solubility of the recording material used. Further, various kinds of additives such as antioxidant, UV-absorber, plasticizer and lubricant may be incorporated in the coating solution depending on the purposes.

In case of using a binder, examples of the binder include naturally occurring organic polymeric substances such as gelatin, cellulose derivatives, dextran, rosin and rubber; as well as synthetic organic polymers, for example, hydrocarbon-based resins such as polyethylene, polypropylene, polystyrene and polyisobutylene; vinyl-based resins such as polyvinyl chloride, polyvinylidene chloride, polyvinyl chloride/polyvinyl acetate copolymer; acrylic resins such as methyl polyacrylate and methyl polymethacrylate; polyvinyl alcohol, chlorinated polyethylene, epoxy resins, butyral resins, rubber derivatives, and pre-condensates of heat-curable resins such as phenol/formaldehyde resins. In case of using the binder together with the recording material in the recording layer, the amount of the binder used is generally within a range of from 0.01 times to 50 times (mass ratio), and preferably within a range of from 0.1 times to 5 times (mass ratio) based on the recording material. The concentration of the recording material in the coating solution prepared as above is generally within a range of from 0.01 to 10% by mass, and preferably within a range of from 0.1 to 5% by mass.

The coating methods employed in the method for producing the optical information recording medium according to the second aspect of the invention include, for example, spraying, spin coating, dipping, roll coating, blade coating, doctor roll and screen printing. The recording layer may be a single layer or a multiple layer, and the thickness of the recording layer is normally within range of from 20 to 500 nm, preferably within a range of from 30 to 300 nm, and more preferably within a range of from 50 to 100 nm. Further, the temperature of the coating solution is preferably within a range of from 23 to 50° C., more preferably within a range of from 24 to 40° C., and particularly preferably within a range of from 23 to 50° C.

Various anti-fading agents may be incorporated in the recording layer for improving lightfastness of the recording layer.

As the anti-fading agent, singlet oxygen quenchers are generally used. Singlet oxygen quenchers already described in publications such as patent specifications can be used.

Specific examples of the singlet oxygen quencher include those described in JP-A-Nos. 58-175693, 59-81194, 60-18387, 60-19586, 60-19587, 60-35054, 60-36190, 60-36191, 60-44555, 60-44555, 60-44389, 60-44390, 60-54892, 60-47069, 63-209995 and 4-25482, JP-B Nos. 1-38680 and 6-26028, the specification of German Patent No. 350399, and Journal of the Chemical Society of Japan, October 1992, p 1141.

The amount of the anti-fading agent such as the singlet oxygen quencher is usually within a range of from 0.1 to 50% by mass, preferably within a range of from 0.5 to 45% by mass, more preferably within a range of from 3 to 40% by mass, and particularly preferably within a range of from 5 to 25% by mass based on the amount of the dye.

<Interlayer Forming Step>

In the method for producing the optical information recording medium according to the second aspect of the invention, the interlayer may be disposed on the recording layer. The interlayer is provided in order to enhance storability of the recording layer and improve adhesion between the recording layer and the cover layer. There is no particular limitation on the material used for the interlayer so long as the material can transmit light used for recording and reproducing information. Preferably, the material is a dielectric material. Specifically, those materials comprising nitrides, oxides, carbides and sulfides of Zn, Si, Ti, Te, Sn, Mo, Ge and the like are preferred. ZnS, $MoO_2$, $GeO_2$, TeO, $SiO_2$, $TiO_2$, ZnO, $ZnS$—$SiO_2$ and $SnO_2$ are preferable, among which $ZnS$—$SiO_2$ and $SnO_2$ are more preferable. The interlayer may be formed by vacuum film deposition such as vapor deposition or sputtering.

As described above, an optical information recording medium according to the third aspect of the invention is obtained by adhering a disc laminate, that is prepared in the course of the light-reflective layer forming step, the recording layer forming step, and optionally, the interlayer forming step, to the cover layer prepared in the step of preparing the cover layer described above.

In the method for producing an optical information recording medium according to the second aspect of the invention, although description has been made referring to an example of producing the optical information recording medium that includes a recording layer containing an organic compound such as the dye as the recording material, the recording layer may be a phase transition recording layer for conducting recording utilizing the phase change, or a photo-magnetic recording layer for conducting recording by photo-magnetism. For example, when the phase transition recording layer is used, the dielectric layer contains $ZnS$—$SiO_2$ or the like, and the dielectric layer is disposed instead of the light transmissive layer. Further, metal compounds such as Sb, Te, Ag, In and chalcogenides may be used as the recording material in the phase transition recording layer.

EXAMPLES

The present invention is explained in more detail by way of examples given below. It should be noted that the invention is not limited to the following examples.

Example 1

The grooved side of a spirally grooved substrate made of polycarbonate (manufactured by Teijin Ltd., trade name: PANLITE AD5503), which was obtained by injection molding and which had a thickness of 1.1 mm and a diameter of 120 mm, was sputtered with Ag to form a light-reflective layer having a layer thickness of 100 nm. Then, phthalocyanine-based dye A (ORAZOL BLUE GN, produced by Ciba Speciality Chemicals Co.) was dissolved in 2,2,3,3-tetrafluoropropanol by carrying out an ultrasonic treatment for 2 hours to thereby obtain a dye coating solution.

The dye coating solution was spin-coated under the conditions of 23° C. and 50% RH by varying rotational frequency from 300 rpm to 4000 rpm to form a recording layer. Then, after storage for 1 to 4 hours at 23° C. and 50RH, an interlayer having a thickness of 5 nm was formed on the recording layer by sputtering ZnS-$SiO_2$. Subsequently, a pressure sensitive adhesive A (acrylic pressure sensitive adhesive,Tg:−30° C.) previously mixed with an isocyanate-type crosslinking agent (COLONATE L, produced by Dai-Nippon Ink Chemical Industry Co.) (pressure sensitive adhesive : crosslinking agent =100 : 0.5) was coated to give a thickness of 20 μm on a polycarbonate sheet (cover film), which was adhered to the interlayer to form a cover layer. Thus, an optical information recording medium of Example 1 was obtained.

Example 2

An optical information recording medium of Example 2 was produced in the same manner as in Example 1 except that the dye A was replaced with a dye B (phthalocyanine dye, FOM0561, manufactured by Wako Junyaku, maximum absorption wavelength: 340 nm, 680 nm).

Example 3

An optical information recording medium of Example 3 was produced in the same manner as in Example 1 except that the dye A was replaced with a dye C, which is represented by the following structural formula (benzotriazole-based dye).

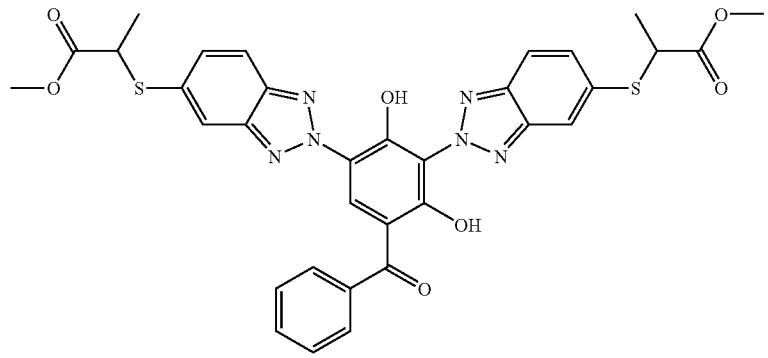

Example 4

An optical information recording medium of Example 4 was produced in the same manner as in Example 1 except that the dye A was replaced with a dye D, which is represented by the following structural formula (aminobutadiene-based dye).

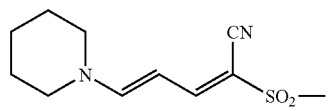

Example 5

An optical information recording medium of Example 5 was produced in the same manner as in Example 1 except that the pressure sensitive adhesive A was replaced with a pressure sensitive adhesive B (pressure sensitive acrylic adhesive, Tg: −5° C.).

Example 6

An optical information recording medium of Example 6 was produced in the same manner as in Example 1 except that the pressure sensitive adhesive A was replaced with a pressure sensitive adhesive C (pressure sensitive acrylic adhesive, Tg: −45° C.).

Example 7

An optical information recording medium of Example 7 was produced in the same manner as in Example 1 except that the thickness of the interlayer was changed to 20 nm.

Example 8

An optical information recording medium of Example 8 was produced in the same manner as in Example 1 except that the thickness of the interlayer was changed to 30 nm.

Example 9

An optical information recording medium of Example 9 was produced in the same manner as in Example 1 except that the thickness of the interlayer was changed to 50 nm.

Comparative Example 1

An optical information recording medium of Comparative Example 1 was produced in the same manner as in Example 1 except that the pressure sensitive adhesive A was replaced with a pressure sensitive adhesive D (acrylic pressure sensitive adhesive, Tg:−5° C.).

Comparative Example 2

An optical information recording medium of Comparative Example 2 was produced in the same manner as in Example 1 except that the pressure sensitive adhesive A was replaced with a pressure sensitive adhesive E (acrylic pressure sensitive adhesive, Tg:−45° C.).

Comparative Example 3

An optical information recording medium of Comparative Example 3 was produced by the same manner as in Example 1 except that the cover layer was formed in a different manner as described below.

-Formation of Cover Layer-

A UV-curable adhesive (SD-347 manufactured by Dai-Nippon Ink Chemical Industry Co., Tg after curing: 30° C.) was spin-coated on the interlayer at 100-300 rpm, on which a polycarbonate sheet (PUREACE, produced by Teijin Co.) of 0.07 mm thickness was overlaid and then the adhesive was spread over the entire surface to give a thickness of 30 µm by varying rotational frequency from 300 to 4000 rpm. Thereafter, the adhesive was cured by irradiating ultraviolet light using a UV lamp, to thus form a cover layer.

Comparative Example 4

An optical information recording medium of Comparative Example 4 was produced in the same manner as in Comparative Example 3 except that the thickness of the interlayer was changed to 20 nm.

Comparative Example 5

An optical information recording medium of Comparative Example 5 was produced in the same manner as in Comparative Example 3 except that the thickness of the interlayer was changed to 50 nm.

-Evaluation of Optical Information Recording Medium- (Test for Recording and Reproducing Information)

Using an apparatus (DDU-1000, manufactured by Pulse Tech Co.) equipped with a 405 nm laser and an NA 0.85 pick-up, signals having a single frequency (2T=0.13 µm) were recorded and reproduced on the optical information recording media obtained in Examples 1-9 and Comparative Examples 1-5 at a clock frequency of 66 MHz and at a linear velocity of 5.6 m/s, and the C/N ratio was measured using a spectrum analyzer. The results are shown in Table 1. Tg (° C.) values in Table 1 are Tg (° C.) of a polymer which has been crosslinked with a polyisocyanate crosslinker.

TABLE 1

| | Organic Dye | Pressure Sensitive Adhesive | Tg (° C.) | Interlayer Thickness (nm) | C/N (dB) |
|---|---|---|---|---|---|
| Example 1 | Dye A | Pressure sensitive adhesive A | −30 | 5 | 56 |
| Example 2 | Dye B | Pressure sensitive adhesive A | −30 | 5 | 55 |
| Example 3 | Dye C | Pressure sensitive adhesive A | −30 | 5 | 54 |
| Example 4 | Dye D | Pressure sensitive adhesive A | −30 | 5 | 52 |
| Example 5 | Dye A | Pressure sensitive adhesive B | −5 | 5 | 52 |
| Example 6 | Dye A | Pressure sensitive adhesive B | −45 | 5 | 55 |
| Example 7 | Dye A | Pressure sensitive adhesive A | −30 | 20 | 51 |
| Example 8 | Dye A | Pressure sensitive adhesive A | −30 | 30 | 47 |
| Example 9 | Dye A | Pressure sensitive adhesive A | −30 | 50 | 45 |
| Comp. Example 1 | Dye A | Pressure sensitive adhesive D | 5 | 5 | 39 |
| Comp. Example 2 | Dye A | Pressure Sensitive Adhesive E | 45 | 5 | 25 |
| Comp. Example 3 | Dye A | UV-curable adhesive | 30 | 5 | 25 |
| Comp. Example 4 | Dye A | UV-curable adhesive | 30 | 20 | 30 |
| Comp. Example 5 | Dye A | UV-curable adhesive | 30 | 50 | 39 |

As seen from the results shown in Table 1, the optical information recording media of Examples 1-9, that were produced using pressure sensitive adhesives containing a polymer having a glass transition temperature Tg of 0° C. or lower which has been crosslinked with a polyisocyanate crosslinker showed a C/N ratio of 40 dB or more and exhibited good recording characteristics. In contrast, the optical information recording media of Comparative Examples 1 and 2, that were produced using pressure sensitive adhesives containing a polymer having a glass transition temperature Tg over of 0° C. and the media of Comparative Examples 3-5, that were produced using a UV-curable adhesive, the C/N ratio was below 40 dB and satisfactory recording characteristics could not be obtained.

Example 10

<Production of Optical Information Recording Medium>

Similarly to Example 1, the grooved side of a spirally grooved substrate made of polycarbonate (manufactured by Teijin Ltd., trade name: PANLITE AD5503), which was obtained by injection molding and which had a thickness of 1.1 mm and a diameter of 120 mm, was sputtered with Ag to form a light-reflective layer having a layer thickness of 100 nm (a step of forming a light-reflective layer).

Then, 20 gram of phthalocyanine-based dye A (ORAZOL BLUE GN, produced by Ciba Speciality Chemicals Co.) was dissolved in 2,2,3,3-tetrafluoropropanol by carrying out an ultrasonic treatment for 2 hours to thereby obtain a dye coating solution.

The dye coating solution was spin-coated under the conditions of 23° C. and 50% RH by varying rotational frequency from 300 rpm to 4000 rpm to form a recording layer. Then, after storage for 1 to 4 hours at 23° C. and 50% RH, the recording layer having a thickness of 5 nm was formed, and on the recording layer was formed the interlayer having the thickness of 5 nm by sputtering ZnS—SiO$_2$.

<Preparation of Cover Layer>

[Preparation of Pressure Sensitive Adhesive Coating Solution]

An acrylic copolymer (solvent: ethyl acetate/toluene=1/1) was mixed with an isocyanate-type crosslinking agent (solvent:ethyl acetate/toluene=1/1) at a ratio of 100:1 (mass ratio) to prepare a coating solution L, a coating solution containing a pressure sensitive adhesive.

[Surface Roughness and Thickness of First Releasable Film]

The first releasable film used in this example was measured for central surface average roughness (SRa) in the following manner. Apparatus: Model HD-2000, manufactured by WYKO Co.

Objective lens: ×50, Intermediate lens: ×0.5

Range for measurement: 242 µm×184 µm

After subjecting the data to gradient correction and cylindrical correction, the central surface average roughness (SRa) was measured. The results of the measurement are shown in Table 2. Table 2 also shows the thickness of the first releasable film.

[(a) Step of Forming a Laminate by Successively Laminating First Releasable Film, Pressure Sensitive Adhesive Layer, Cover Film and Second Releasable Film, and (b) Step of Winding Laminate into a Roll]

First, the pressure sensitive adhesive layer was formed on the surface of the cover film using the apparatus for providing the pressure sensitive adhesive layer shown in FIG. 2.

In more detail, the first releasable film (polyethylene releasable film) wound around a roll 1 was delivered in the direction of an arrow and a pressure sensitive adhesive coating solution L was applied on the surface of the first releasable film using a coating device 2 (coating step). Then, the first releasable film provided with the pressure sensitive adhesive coating layer was dried at 100° C. using a drier 3 placed in a drying region (drying step), to obtain the first releasable film having a pressure sensitive adhesive layer of 20 µm thick. Then, the first releasable film provided with the pressure sensitive adhesive layer was further conveyed and adhered to the cover film (polycarbonate film, Teijin PUREACE, thickness: 80 µm, provided with a second releasable film at one surface: surface roughness on the surface D of second releasable film 250 nm) delivered from a roll 4 in an adhering region "a" such that the polycarbonate surface of the cover film was brought into contact with the pressure sensitive adhesive layer (adhering step). Thus, a laminate formed by successively superimposing the first releasable film, the pressure sensitive adhesive layer, the cover film, and the second releasable film was obtained. Then, the laminate was wound into a roll 5 (winding step).

[Step of Maintaining Until Substantial Completion of Crosslinking Reaction in Pressure Sensitive Adhesive Layer]

The wound laminate was maintained for 72 hours in an atmosphere of 23° C. and 50% RH. "72 hours" is a duration until absorption peaks occurring near 2275-2250 cm$^{-1}$ attributable to isocyanate substantially disappeared when the pressure sensitive adhesive layer was measured in this example by infrared absorption spectroscopy in the atmosphere described above, which is a duration corresponding to the phrase "until substantial completion of crosslinking reaction in the pressure sensitive adhesive layer" in this example.

Subsequently, the laminate was punched into a shape identical with that of the substrate (disc shape).

Then, the first releasable film was peeled off from the disc shape laminate and then the interlayer was adhered to the pressure sensitive adhesive layer using a roller as the pressing means. Further, the second releasable film was peeled to thereby obtain the optical information recording medium of Example 10.

Evaluation (1) C/N (Carrier-to-Noise Ratio)

Using DDU (manufactured by Pulse Tech Co.) equipped with a 405 nm laser and an NA pick-up of 0.85, signals having a single frequency (2T=0.13 µm) were recorded and reproduced on the thus produced optical information recording medium at a clock frequency of 66 MHz/linear velocity of 5.6 m/s, and the C/N ratio was measured by a spectrum analyzer. The results are shown in Table 2.

(2) Evaluation for Uneven Thickness of Cover Layer

The thus produced optical information recording media were measured for the thickness of the cover layer at 8 points in the circumferential direction (45° distance) and at 8 points in the radius direction (5 mm distance) of each information recording medium, to be referred to as a sheet distance between two points, by a laser displacement meter (LT 8020) produced by Keyence. That is, at 64 points in total, unevenness of the thickness was determined based on an equation of (maximum value−minimum value/average value). As the criterion for the judgement, the value within 2% was designated as "○" (with no practical problem) and the value exceeding 2% was designated as "X" (difficult for practical use). The results are shown in Table 2.

(3) Evaluation of Air Bubble Contamination

The produced optical information recording media were observed from the side provided with the cover layer by a telecentric microscope (produced by Kowa Co.) within a measurement range of 4.8 mm×6.4 mm, at about 40×for 10 view fields to examine the air contamination ratio. As the criterion for the judgement, those having no air bubble (the number of the bubbles: zero) were designated as "○" and those having 1 to 5 air bubbles were designated as "Δ" and those having 6 or more air bubbles were designated as "X" in the average value. The results are shown in Table 2.

Examples 11-14

Optical information recording media of Examples 11 to 14 were produced in the same manner as in Example 10 except that in the step of preparing the cover layer, the first releasable film was replaced with the films having the surface roughness and the thickness, respectively, shown in Table 2.

The produced optical information recording media were evaluated in the same manner as in Example 10. The results are shown in Table 2.

Comparative Examples 6-9

Optical information recording media of Comparative Examples 6 to 9 were produced in the same manner as in Example 10 except that in the step of preparing the cover layer, the first releasable film was replaced with the films having the surface roughness and the thickness, respectively, shown in Table 1.

The produced optical information recording media were evaluated in the same manner as in Example 10. The results are shown in Table 2.

TABLE 2

| | Species of First Releasable Film | SRa of Surface A (nm) | SRa of Surface B (nm) | Thickness (µm) | C/N (dB) | Unevenness of Thickness (%) | Air Bubble |
|---|---|---|---|---|---|---|---|
| Example 10 | (1) | 30 | 50 | 25 | 55 | 0.8 | ○ |

TABLE 2-continued

| | Species of First Releasable Film | SRa of Surface A (nm) | SRa of Surface B (nm) | Thickness (μm) | C/N (dB) | Unevenness of Thickness (%) | Air Bubble |
|---|---|---|---|---|---|---|---|
| Example 11 | (2) | 50 | 50 | 25 | 52 | 1.2 | ○ |
| Example 12 | (3) | 30 | 100 | 25 | 52 | 1.3 | ○ |
| Example 13 | (4) | 30 | 100 | 20 | 51 | 1.5 | ○ |
| Example 14 | (5) | 50 | 100 | 25 | 50 | 1.7 | Δ |
| Comp. Example 6 | (6) | 80 | 50 | 25 | 40 | 3.6 | X |
| Comp. Example 7 | (7) | 30 | 130 | 25 | 44 | 3.1 | X |
| Comp. Example 8 | (8) | 80 | 130 | 25 | 38 | 3.6 | X |
| Comp. Example 9 | (9) | 30 | 50 | 15 | 42 | 2.6 | X |

From the results shown in Table 2, it was revealed that the optical information recording media of Examples 10 to 14 manufactured employing the production method according to the invention exhibited good C/N ratios in the recording characteristics and sufficient unevenness of thickness, and further, less incidences of air bubble contamination. Particularly, it was found that the optical information recording medium of Example 10 showed extremely low unevenness of thickness since the surface roughness (SRa) was small both at the surface A and surface B of the first releasable film used. In contrast, the optical information recording medium of Example 14 was found to have relatively large surface roughness (SRa) at both the surface A and the surface B of the first releasable film, which was within an acceptable range in practical use, and further, the unevenness of thickness was larger and incidence of air bubble contamination was also high.

On the other hand, it was revealed that the optical information recording media of Comparative Examples 6-9 showed a lower C/N ratio in the recording characteristics, larger unevenness of thickness, and further, more incidences of air bubble contamination as compared to the optical information recording media of Example 10 to 14. Particularly, as found with the optical information recording medium of Comparative Examples 9, even when the surface roughness (SRa) was small both at the surface A and surface B of the first releasable film used, the surface shape of the second releasable film was transferred to the pressure sensitive adhesive layer through the step of winding the laminate into a roll, and consequently, no preferable results were obtained in any of the evaluated parameters.

As detailed above, the present invention provides an optical information recording medium having high reflectance, a high carrier/noise ratio (C/N) and stable recording and reproducing characteristics. Further, the invention provides a method for producing an optical information recording medium exhibiting excellent recording characteristics and durability in the method for producing an optical information recording medium by employing the process of preparing the cover layer including a step of winding the layer into a roll, as well as an optical information recording medium produced by the production method. Further, the invention provides a method for producing an optical information recording medium having excellent producibility, and an optical information recording medium produced by the production method.

What is claimed is:

1. An optical information recording medium comprising a substrate having successively disposed thereon a recording layer, an interlayer which consists of a single layer, a pressure sensitive adhesive layer and a cover film,
    wherein the interlayer has a thickness of 1 to 20 nm,
    wherein the recording layer contains an organic dye selected from the group consisting of phthalocyanine-based dyes, benzotriazole-based dyes and aminobutadiene-based dyes, wherein information is recordable and reproducible by irradiating laser light from the side provided with the cover layer, and
    wherein the pressure sensitive adhesive layer contains a pressure sensitive adhesive having a glass transition temperature Tg of 0° C. or lower which has been crosslinked with a polyisocyanate crosslinker and
    wherein only the interlayer is provided between the recording layer and the pressure sensitive adhesive layer.

2. The optical information recording medium according to claim 1, wherein the substrate is made of amorphous polyolefin or polycarbonate.

3. The optical information recording medium according to claim 1, wherein the pressure sensitive adhesive layer comprises an acrylic polymer or a methacrylic polymer.

4. The optical information recording medium according to claim 3, wherein the polymer is contained in the pressure sensitive adhesive layer in an amount of 50% to 99% by mass based on a total mass of the pressure sensitive adhesive layer after drying.

5. The optical information recording medium according to claim 4, wherein the pressure sensitive adhesive layer has a thickness of 1 to 200 μm.

6. The optical information recording medium according to claim 1, wherein the interlayer comprises a dielectric material.

7. The optical information recording medium according to claim 6, wherein the dielectric material is a compound selected from the group consisting of nitrides, oxides, carbides and sulfides of Zn, Si, Ti, Te, Sn, Mo and Ge.

8. The optical information recording medium according to claim 6, wherein the dielectric material is a compound selected from the group consisting of ZnS, $MoO_2$, $GeO_2$, TeO, $SiO_2$, $TiO_2$, ZnO, ZnS—$SiO_2$, and $SnO_2$.

9. An optical information recording medium comprising a substrate having successively disposed thereon a recording layer, an interlayer which consists of a single layer, a pressure sensitive adhesive layer and a cover film,
wherein the interlayer has a thickness of 1 to 20 nm wherein only the interlayer is provided between the recording layer and the pressure sensitive adhesive layer,
wherein the substrate includes a pre-groove having a track pitch of 200 to 400 nm and a groove depth of 20 to 150 nm,
wherein the recording layer contains an organic dye selected from the group consisting of phthalocyanine-based dyes, benzotriazole-based dyes and aminobutadiene-based dyes,
wherein information is recordable and reproducible by irradiating laser light from the side provided with the cover layer, and
wherein the pressure sensitive adhesive layer contains a pressure sensitive adhesive having a glass transition temperature Tg of 0° C. or lower which has been crosslinked with a polyisocyanate crosslinker.

10. An optical information recording medium comprising a substrate having successively disposed thereon a recording layer, an interlayer which consists of a single layer, a pressure sensitive adhesive layer and a cover film,
wherein the interlayer has a thickness of 1 to 20 nm wherein only the interlayer is provided between the recording layer and the pressure sensitive adhesive layer,
wherein the cover film is made of a material selected from the group consisting of polycarbonate, cellulose triacetate and acrylic polymer,
wherein the recording layer contains an organic dye selected from the group consisting of phthalocyanine-based dyes, benzotriazole-based dyes and aminobutadiene-based dyes,
wherein information is recordable and reproducible by irradiating laser light from the side provided with the cover layer, and
wherein the pressure sensitive adhesive layer contains a pressure sensitive adhesive having a glass transition temperature Tg of 0° C. or lower which has been crosslinked with a polyisocyanate crosslinker.

11. A method for producing an optical information recording medium including a substrate having successively disposed thereon a recording layer, an interlayer, a pressure sensitive adhesive layer and a cover film
the method comprising the steps of preparing a cover layer by forming a laminate by successively superimposing a first releasable film, the pressure sensitive adhesive layer, the cover film and a second releasable film, winding the laminate into a roll, providing the cover layer from the roll to the recording layer, and adhering the cover layer to the recording layer,
wherein the interlayer has a thickness of 1 to 20 nm,
wherein the recording layer contains an organic dye selected from the group consisting of phthalocyanine-based dyes, benzotriazole-based dyes and aminobutadiene-based dyes,
wherein information is recordable to and reproducible from the optical information recording medium by irradiating laser light from the side provided with the cover layer,
wherein the pressure sensitive adhesive layer contains a pressure sensitive adhesive having a glass transition temperature Tg of 0° C. or lower which has been crosslinked with a polyisocyanate crosslinker, and
wherein the first releasable film has a central surface average roughness (SRa) at a surface in contact with a surface of the pressure sensitive adhesive layer of 50 nm or less, a central surface average roughness (SRa) at an opposite surface of 100 nm or less, and a thickness of 20 μm or more.

12. The method according to claim 11, further comprising, after the step of winding the laminate into a roll, the successive steps of maintaining the laminate until a crosslinking reaction in the pressure sensitive adhesive layer is substantially completed, punching the laminate into a disc shape, maintaining the disc-shape laminate while piling the laminate substantially vertically or substantially horizontally and peeling off the first and the second releasable films.

13. The method according to claim 11, wherein the releasable films are selected from the group consisting of a polyethylene film, a polypropylene film, a polyethylene terephthalate film, a vinyl chloride film and a vinylidene chloride film.

14. The method according to claim 11, wherein the cover film is made of polycarbonate or cellulose triacetate.

15. The method according to claim 14, wherein the cover film has a thickness of 0.03 to 0.15 mm.

16. The method according to claim 11, wherein the pressure sensitive adhesive layer contains a pressure sensitive adhesive selected from the group consisting of acrylic pressure sensitive adhesives, rubber-based pressure sensitive adhesives and silicone-based pressure sensitive adhesives.

17. Method according to claim 16, wherein the pressure sensitive adhesive further contains an isocyanate-type crosslinking agent.

18. The method according to claim 11, wherein the recording layer contains a dye selected from the group consisting of cyanine dyes, oxonol dyes, metal complex-based dyes, azo dyes and phthalocyanine dyes.

19. The method according to claim 18, wherein the recording layer contains a singlet oxygen quencher as an anti-fading agent.

20. An optical information recording medium including a substrate having successively disposed thereon a recording layer, an interlayer which consists of a single layer, a pressure sensitive adhesive layer and a cover film,
wherein the interlayer has a thickness of 1 to 20 nm wherein only the interlayer is provided between the recording layer and the pressure sensitive adhesive layer,
the optical information recording medium being produced by a method comprising preparing a cover layer by forming a laminate by successively superimposing a first releasable film, the pressure sensitive adhesive layer, the cover film and a second releasable film, winding the laminate into a roll, providing the cover layer from the roll to the recording layer, and adhering the cover layer to the recording layer, wherein the substrate includes a pre-groove having a track pitch of 200 to 400 nm and a groove depth of 20 to 150 nm, wherein the recording layer contains an organic dye selected from the group consisting of phthalocyanine-based dyes, benzotriazole-based dyes and aminobutadiene-based dyes, wherein information is recordable and reproducible by irradiating laser light from the side provided with the cover layer, and wherein the pressure sensitive adhesive layer contains a pressure sensitive adhesive having a glass transition temperature Tg of 0° C. or lower which has been crosslinked with a polyisocyanate crosslinker, and wherein the first releasable film has a central surface average roughness (SRa) at a surface in contact with a surface of the pressure sensitive adhesive layer of 50 nm or less, a central surface average roughness (SRa) at an opposite surface of 100 nm or less, and a thickness of 20 µm or more.

21. An optical information recording medium including a substrate having successively disposed thereon a recording layer, an interlayer which consists of a single layer, a pressure sensitive adhesive layer and a cover film, wherein the interlayer has a thickness of 1 to 20 nm wherein only the interlayer is provided between the recording layer and the pressure sensitive adhesive layer, the optical information recording medium being produced by a method comprising preparing a cover layer by forming a laminate by successively superimposing a first releasable film, the pressure sensitive adhesive layer, the cover film and a second releasable film, winding the laminate into a roll, providing the cover layer from the roll to the recording layer, and adhering the cover layer to the recording layer, wherein the cover film is made of a material selected from the group consisting of polycarbonate, cellulose triacetate and acrylic polymer, wherein the recording layer contains an organic dye selected from the group consisting of phthalocyanine-based dyes, benzotriazole-based dyes and aminobutadiene-based dyes, wherein information is recordable and reproducible by irradiating laser light from the side provided with the cover layer, and wherein the pressure sensitive adhesive layer contains a pressure sensitive adhesive having a glass transition temperature Tg of 0° C. or lower which has been crosslinked with a polyisocyanate crosslinker, and wherein the first releasable film has a central surface average roughness (SRa) at a surface in contact with a surface of the pressure sensitive adhesive layer of 50 nm or less, a central surface average roughness (SRa) at an opposite surface of 100 nm or less, and a thickness of 20 µm or more.

22. An optical information recording medium comprising a substrate having successively disposed thereon a recording layer, an interlayer, a pressure sensitive adhesive layer and a cover film, wherein the interlayer has a thickness of 1 to 20 nm, wherein the recording layer contains an organic dye selected from the group consisting of phthalocyanine-based dyes, benzotriazole-based dyes and aminobutadiene-based dyes, wherein information is recordable and reproducible by irradiating laser light from the side provided with the cover layer, wherein the pressure sensitive adhesive layer contains a pressure sensitive adhesive having a glass transition temperature Tg of 0° C. or lower which has been crosslinked with a polyisocyanate crosslinker, wherein only the interlayer is provided between the recording layer and the pressure sensitive adhesive layer, and wherein the interlayer comprises a compound selected from the group consisting of $ZnS$, $MoO_2$, $GeO_2$, $TeO$, $SiO_2$, $TiO_2$, $ZnO$, $ZnS$—$SiO_2$ and $SnO_2$.

* * * * *